United States Patent [19]
Miyamae

[11] 3,979,081
[45] Sept. 7, 1976

[54] MOTORIZED FISHING REEL

[76] Inventor: Toshiaki Miyamae, Lot 16, No. 2, 2-Chome, Nishi-Iwata, Higashi-Osaka, Osaka, Japan

[22] Filed: Feb. 1, 1974

[21] Appl. No.: 438,618

[52] U.S. Cl. .............................. 242/84.1 A; 242/219
[51] Int. Cl.² ....................................... A01K 89/017
[58] Field of Search ................ 242/84.1 A, 84.1 R, 242/84.2 B, 84.2 R, 211, 212, 213, 217, 218, 219, 84.5 R, 84.51 R

[56] References Cited
UNITED STATES PATENTS

| | | | |
|---|---|---|---|
| 2,417,732 | 3/1947 | Bland et al. | 242/213 |
| 2,783,001 | 2/1957 | Grice | 242/84.2 B |
| 3,432,114 | 3/1969 | Meisner | 242/219 X |
| 3,669,378 | 6/1972 | Miyamae | 242/84.1 A |
| 3,814,349 | 6/1974 | Menne | 242/217 |

FOREIGN PATENTS OR APPLICATIONS
784,183  10/1957  United Kingdom ............ 242/84.2 R

*Primary Examiner* — Billy S. Taylor
*Attorney, Agent, or Firm* — Moonray Kojima

[57] ABSTRACT

A motorized fishing reel having constructions wherein at least two externally operable adjusting means are applied to screwably adjust the pressing force of springs connected thereto so as to effectively transmit a rotary power from an electric motor to a rotary shaft through at least two clutch means connected to said springs, and wherein a resilient pin means is detachably inserted through a tapered end of said rotary shaft into an annular thread formed on said end so as to permit a spool to be easily mounted to and removed off said shaft by moving an operating lever integrated with a cam serving to expand said pin means.

2 Claims, 8 Drawing Figures

MOTORIZED FISHING REEL

The present invention relates generally to improvements in a motorized fishing reel, and more particularly to a small and light electro-motive fishing reel provided with a mechanism for mounting a spool to the reel and mechanisms for adjusting the rotation of a spool shaft as desired.

For the purpose of practical use in fishing sites, the motorized fishing reels are required for many operational functions and effects. Thus most of them now available on the market cannot but be complicated in structure, large in size and heavy in weight, consequently increasing the manufacturing cost partly due to the large number of components required and partly due to many assembling operations involved.

Further due to the aforesaid large size and heavy weight of the fishing reels thus produced, they are bulky to carry about and difficult of operating, thus making an angler feel fatigued in a short length of time with his hand grasping a rod provided with such a reel. In addition, the existing motorized fishing reels are so provided that they are selectively providable with a spool wound with a fishing line suitable for the kind and size of fish swimming generally in a shoal in a suitable depth of the sea.

In order to fixedly mount such selected spool to the reel, method is generally adapted to form a screw thread on the outer periphery of a rotary shaft portion of the spool and a suitable mounting device is screwably tightened to this screw thread.

While the use of the aforesaid mounting device makes it possible to inseparably fix a spool to a fishing reel in an easy manner, there still remain disadvantages that the mounting device tightly screwed to the spool in the above-mentioned manner is subject to the rotation and/or vibrations of the spool which may loosen the screwably tightened relation of the spool with the reel, finally causing the spool to come off the reel.

Accordingly, the present invention has been devised to eliminate all the above-mentioned drawbacks and disadvantages, and has as one of its main objects the provision of a small and light electro-motive fishing reel which is producible with fewer number of components, and hence at a lower manufacturing cost, than the conventional fishing reels, but yet operable more effectively than the latter.

Another object of the invention is to provide a motorized fishing reel having the construction wherein a spool wound with a desired fishing line can be fixedly mounted on a spool shaft in a very easy manner and held thereon inseparably without being subjected to the rotation and/or vibrations of the spool or any external impacts impinged on the spool.

These and other objects, features and advantages of the invention will be apparent in the following description and claims made with reference to the accompanying drawings, in which:

Figure 1:
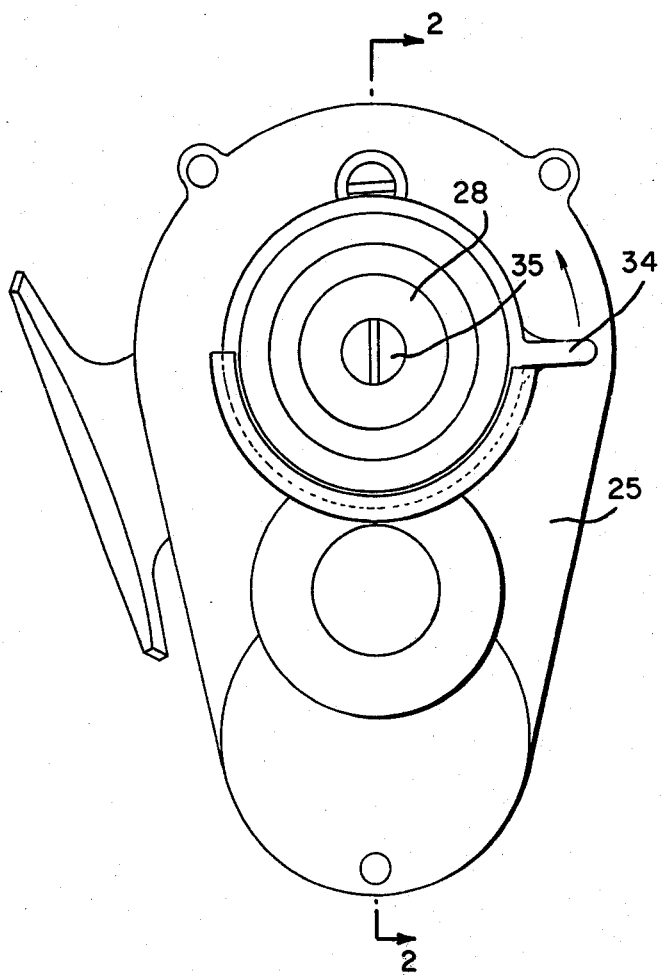
FIG. 1 is a side view of a reel body embodied in accordance with the invention.

Setting forth in detail some preferred embodiments of the invention with reference to the accompanying drawings, reference numeral 1 designates an electric motor. Outwardly of said motor 1 there is projected a driving shaft 2 for supporting a pinion 3 rotatably along therewith. Numeral 4 denotes a driven shaft which is formed at one end with a small diameter shaft portion 5 for fixedly mounting a pinion thereon. The other end of said driven shaft 4 is formed with a large diameter shaft portion 7 for supporting a reduction gear 8 in freely rotatable relation therewith. Said driven shaft 4 is at its outermost extremity engraved with a screw thread 9 through which an anti-rotation plate 11 and an adjusting nut 12 are mounted on the driven shaft 4 by means of a fixture element 10.

A coil spring 13 is at one end contacted with said fixture element 10 and at the other end contacted with the reduction gear 8 in such a manner that the coil spring 13 is normally held between said fixture element 10 and said reduction gear 8 thereby to press the reduction gear 8. A clutch plate 14 is provided on a square-section shaft portion 15 of said driven shaft 4. In contactable relation with said clutch plate 14, a friction element lined members 16 is mounted on said reduction gear 8. Thus when the adjusting nut 12 is manually made to screwably advance to the right, said coil spring 13 is forced to press the clutch plate 14 against the lined member 16 thereby positively transmitting the rotation of the reduction gear 8 to the pinion 6.

Figure 2:
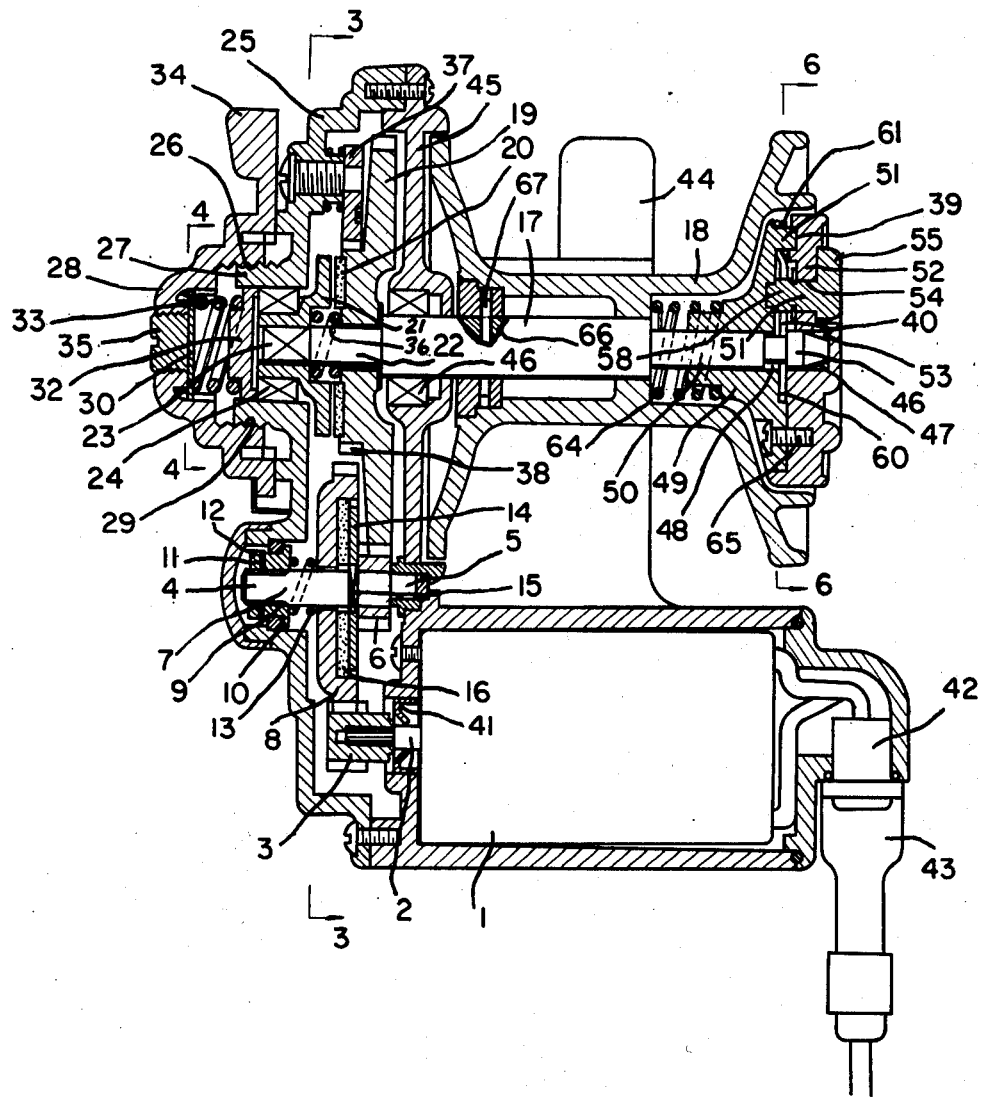
FIG. 2 is a partial cross-section view taken on the line 2—2 of FIG. 1.

To recapitulate, as depicted in FIG. 2, gear 8 having friction plate 14 mounted thereon, is freely movable about shaft 7, by means of pinion 3 connected to shaft 2 of motor 1. Also mounted on shaft 7 are fixture element 10 and between element 10 and gear 8, spring 13. The smaller ended part 4 of shaft 7, has threads 9 provided thereon. Nut 12 is screwed onto threads 9. Between element 10 and nut 12 is an anti-rotation plate 11. Element 10 is freely rotatable within holding means (not numbered). By screwing in nut 12, antirotation plate 11 is pushed to the right, to push element 10 to the right, and to exert pressure on spring 13, thereby to cause gear 8 to move to the right and cause friction plate 14 to contact friction plate 16, which plate 16 being connected to shaft 7 will cause the shaft to move. The shaft 7 and nut 12 now rotate and antirotation device 11 prevents nut 12 from coming off.

A rotary shaft 17 is provided on a spool 18 in a manner that a main gear 19 intermeshingly engaged with said pinion 6 is supported in freely rotatable relation with respect to the shaft 17. Said main gear 19 is provided with a friction element lined member 20. In contactable relation therewith, a clutch plate 21 is mounted on a square-section shaft portion 23 of a small diameter shaft portion 22 formed on said rotary shaft 17. Said clutch plate 21 is supported on a cover 25 for housing a fishing reel body of the invention, by means of a bearing 24. Said cover 25 includes a projection 27 formed with a male screw 26 to which a female screw 29 of an adjusting cap 28 to be described hereinafter is screwably mounted.

Figure 4:
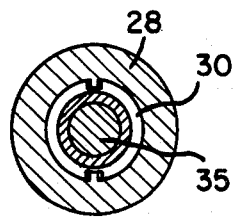
FIG. 4 is a vertical cross-section view taken on the line 4—4 of FIG. 2.

As shown in FIG. 4, in the inside of said adjusting cap 28 there is non-rotatably supported a receiving plate 30 through a thread 31 engraved thereon. Between said receiving plate 30 and a pressing plate 32 contactable with said bearing 24, is held a coil spring 33.

On the adjusting cap 28 is fixedly mounted an operating lever 34 for controlling the rotation of the rotary shaft 17 so that when said lever is moved about its axis, the cap 28 is screwably moved in axial direction thereby to increase the pressing force of the coil spring 33 between the receiving plate 30 and the pressing plate 32. Consequently, the bearing 24 is caused to move in axially inward direction. For a fuller understanding, the clutch plate 21 is caused to move until it is screwably movable back and forth in axial direction when rotated by means of a suitable screw driver or the like. Thus even if said friction element lined member 20 of the main gear 19 is frictionally worn out, the space between the member 20 and the clutch plate 21 can always be regularly maintained merely by screwably moving the nut 35 about its axis.

Between the main gear 19 and the clutch plate 21 there is held a coil spring 36 which normally serves to position the plate 21 and the friction element lined member 20 at a regularly spaced apart interval with one another.

Figure 3:
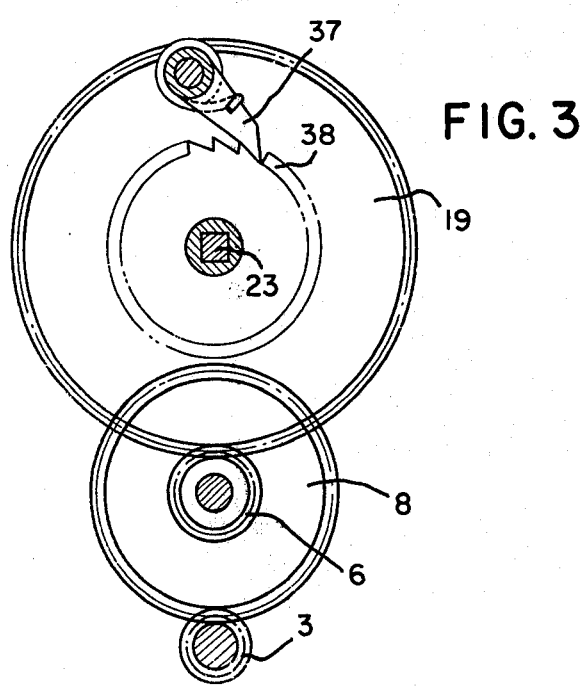
FIG. 3 is a partial cross-section view taken on the line 3—3 of FIG. 2.

A ratchet pawl 37 shown in FIG. 3 has its upper end fixed to the cover 25 by means of a suitable bolt or the like while its lower end is intermeshingly engaged with a gear 38 which is fixed to the main gear 19 thereby preventing the reverse rotation of the rotary shaft 17. A drag 39 is fixedly mounted to the end of the rotary shaft 17 by means of a spring 40 as shown at the right hand side with respect to FIG. 2. Numeral 41 is a seal member, 42 is a socket, 43 being a plug and 44 is a mounting seat for rigidly mounting the reel body of the invention to a fishing rod. Between a wall plate 45 and the rotary shaft 17 there is mounted a bearing 46 for rotatably supporting the shaft 17.

By the above-mentioned arrangement, when the electric motor 1 is rotated by closing a switch (not shown), the driving shaft 2 of the motor is also rotated together therewith. In this case, the rotation of the driving shaft 2 is transmitted through the pinion 3 to the reduction gear 8. The the nut 12 mounted at one side of the driven shaft 4 may be manually screwably moved to result in the clutch plate 14 being brought into contact with the friction element lined member 16. Consequently, the rotation of the reduction gear 8 is positively transmitted to the pinion 6, and further therethrough to the main gear 19.

The main gear 19 is mounted in freely rotatable relation with respect to the rotary shaft 17 so that the rotation of the former is not transmitted to the latter. Thus if an angler intends to rotate the rotary shaft 17 in order to retrieve a fishing line, he moves the operating lever 34 about its axis. By so doing, the adjusting cap 28 is screwably advanced in axially inward direction to press the clutch plate 21 by means of the coil spring 33, the result being that the clutch plate 21 is brought into contact with the friction element lined member 20 to transmit the rotation of the main gear 19 to the rotary shaft 17 from the clutch plate 21 whereby the spool 18 mounted on the shaft 17 is driven into rotation.

To recapitulate, as depicted in FIG. 2, pressing plate 32, bearing 24, having freely rotatable therein plate 21 which is fixedly connected to the square end portion 23 of shaft 17, are movable within frame projection 27. When plate 32 is moved to the right by force of spring 33, the bearing 24 and plate 21 are pushed also to the right, thereby to cause plate 21 to contact friction plate 20 which is connected to gear 19. In this manner, gear 19 which is moved by pinion 6, then moves plate 21 and thereby shaft 17. To move spring 33, to the right, lever 34 screws cap 28 about threads 26 of frame projection 27. Cap 28 is moved to the right to compress spring 33.

On the other hand, if an angler wants to pay out the line, he returns the operating lever 34 to its original position so as to release the contact of the clutch plate 21 with the friction element lined member 20 whereby the rotary shaft 17 is made freely rotatable with respect to the main gear 19. This has a result that the rotary shaft 17 is rotated regardless to the rotation of the main gear 19.

In the following, description will be made in detail with reference to the particular mechanism for mounting a desired spool to the fishing reel, which mechanism is also importantly characteristic of the present invention.

Said rotary shaft 17 is at its other end formed with a small diameter shaft portion 46 (at the right hand side with respect to FIG. 2 of the accompanying drawings). At the foremost extremity of said portion 46 there is formed a tapered shaft portion 47. In a suitable position of said portion 47 there is a groove 48 as shown in FIGS. 2 and 6 to 8. A receiving member 49 has a through hole 50 for receiving said small diameter shaft portion 46. On the outer periphery of the receiving member 49 there is provided a projection 51 to be described hereinafter.

A mounting means 52 is bored with a blind hole 53 for rotatably supporting said small diameter shaft portion 46, and with a through hole 54 positioned close to the blind hole 53. In the through hole 54 there is inserted an operating lever 55 which will be described hereinafter.

Figure 5:
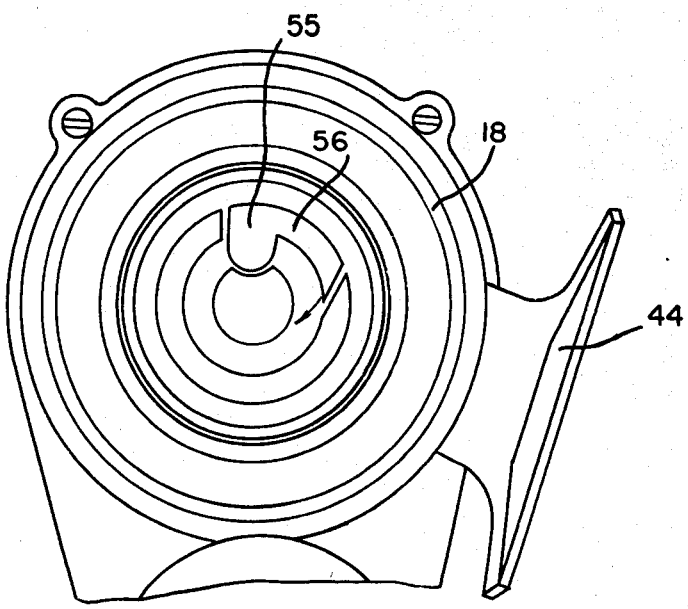
FIG. 5 is a partial right hand-side view of FIG. 2.

Said operating lever 55 comprises a manually operating lever portion 56 as clearly shown in FIG. 5 exposed to the outer surface of the mounting means 52, a shaft portion 57 inserted into said through hole 54 of the mounting means 52, a cam 58 connected to the shaft portion 57 and a small diameter shaft portion 59 connected to the latter portion.

Figure 6:
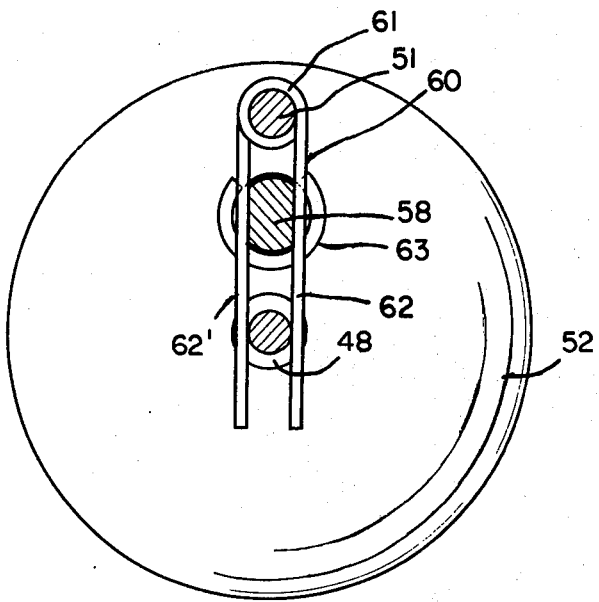
FIG. 6 is an enlarged vertical cross-section view taken on the line 6—6 of FIG. 2.
Figure 8:
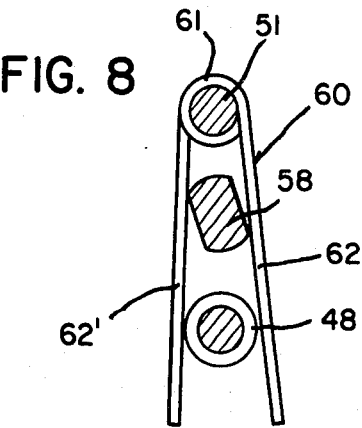
FIG. 8 is likewise explanatory of another operation of the elemental parts of the invention.
Figure 7:
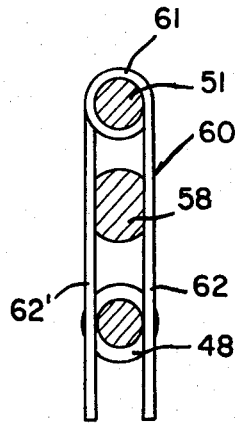
FIG. 7 is explanatory of an operation of the elemental parts of the invention.

As shown in FIGS. 6 to 8, a spring 60 comprises a semicircularly curved base 61 which is insertible into said projection 51 and a pair of slender legs 62, 62' normally extended in parallel relation with one another from said base 61 so that when the base 61 is inserted into the projection 51, said pair of slender legs 62, 62' are placed in such a position as to be held between the cam 58 of the operating lever 55 and the groove 48 of the small diameter shaft portion 46.

In order to prevent the operating lever 55 from coming off the mounting means 52 there is provided a snap ring 63. A coil spring 64 has one end contacted with the notched portion of the spool 18 and the other end contacted with one side of the receiving member 49 thereby to normally outwardly press the receiving member 49 which is rigidly fixed to the mounting means 52 by means of a screw 65.

A regulating plate 66 in FIG. 2 is inserted into the rotary shaft 17 and rigidly fixed thereto by means of a pin 67. Said regulating plate 66 is fitted to a notched portion 68 which is formed on the spool portion 18 in conformity with the shape of the regulating plate 66.

The spool 18 is removable from the rotary shaft 17 in the following manner. In the first place, the operating lever 55 exposed to the outer surface of the mounting means 52 is slightly moved about its axis. By so doing the cam 58 connected to the lever 55 is also rotated along therewith to outward expand said pair of slender legs 62, 62' positioned in the annular thread 48 of the small diameter shaft portion 46 whereby the legs 62, 62' are moved off the groove 48 and released from their respective engagement with the receiving member 49, the result being that the mounting means 52 integrated with said receiving member 49 by means of the screw 65 can be outwardly taken off together with the member 49. By so doing the spool 18 is easily taken off the rotary shaft 17. In this case, the cam 58 which has been slightly moved is automatically returned to its original position by the resiliency of the legs 62, 62'.

In order to replace the spool 18 with a new one, the operating lever 55 is oriented in its original position and the small diameter shaft portion 46 of the rotary shaft 17 is inserted into the through hole 50 of the receiving member 49 so that the foremost end of said portion 46 is forcibly pressed to contact the legs 62, 62'. With further pressure applied, said foremost end is moved to forcibly expand the legs 62, 62' through the tapered shaft portion 47 of the end. When the legs 62, 62' thus considerably expanded come to the annular thread 48 of the small diameter shaft portion 46, they are returned to their respective original position whereby the new spool is fixedly mounted to the rotary shaft 17.

In the present embodiment, the cam 58 of the operating lever 55 is exemplified as being resiliently held in the position of the annular thread 48 by means of the coil spring 60 convoluted on the projection 51 of the receiving member 49. Thus the mounting means 52 is easily removed merely by moving the cam 58 since the legs 62, 62' of the spring 60 are so adapted as to be expanded merely by moving the cam 58 thereby to release their respective engagement with the annular thread 48.

Thus according to the present invention, great advantages are provided that any spool can be easily mounted to, and removed from, the reel without wrong operation. It is further understood that the motorized fishing reel of the invention is producible with a far less number of components required, hence dimensionally smaller, weighingly lighter and at a lower manufacturing cost, than the conventional reels.

While but a few preferred embodiments of the invention have been particularly shown and described, it is distinctly understood that the present invention, illustrated and described in detail in the drawings and foregoing description, is to be considered as illustrative and restrictive in character, and that all changes and modifications that come within the spirit of the present invention are included.

What is claimed is:

1. A motorized fishing reel comprising
   an electric motor having a drive shaft;
   a first pinion affixed to said drive shaft of said motor;
   a driven shaft having a large diameter portion at one end and a smaller diameter portion at the other end and a square section portion therebetween, a part of said large diameter portion having threads thereon;
   a reduction gear rotatably held by the large diameter portion of said driven shaft and engagable with said first pinion;
   a second pinion affixed to the smaller diameter portion of said drive shaft;
   a first clutch plate affixed to said square portion of said driven shaft;
   a first friction member affixed to said reduction gear and positioned to be contactable with said first clutch plate;
   a manually operable first adjusting nut screwable into said threads at said outer portion of said large diameter portion of said driven shaft;
   anti-rotation device connected to said adjusting nut to prevent said nut from moving after manual operation;
   first spring means disposed between said anti-rotation device and said reduction gear whereby said first adjusting nut controllaby adjusts the force of said first spring means to normally press said first clutch plate against said first friction member thereby to controllably transmit rotation of said reduction gear to said second pinion;
   a rotary shaft having a small diameter portion, a tapered portion having an annular groove therein and a square section portion and disposed parallel to the axis of said second pinion;
   a mounting structure for supporting said rotary shaft;
   a main gear movably supported on said small diameter portion of said rotary shaft and engagable with the said second pinion;
   a second friction member affixed to said main gear;
   a second clutch plate affixed to said square section of said rotary shaft and being connectable with said second friction member
   a bearing disposed on said second clutch plate with its axis coaxial with the axis of said rotary shaft;
   a pressing plate disposed adjacent to said second clutch plate for pressing said bearing;
   a receiving plate disposed opposite said pressing plate;
   a second spring means disposed between said pressing plate and said receiving plate to normally maintain resilient force between said receiving plate and said pressing plate;
   a second adjusting nut connectable to said receiving plate for manually adjusting the space between said second clutch plate and said receiving plate by adjusting said second spring means;
   a cap for mounting said second adjusting nut to said receiving plate;
   a first operating lever affixed to said cap for rotating manually said cap;
   a third spring means disposed between said main gear and said second clutch plate for controlling the space between said main gear and said second clutch plate;
   a second gear means disposed toward the end opposite the location of said main gear and having ratchet teeth and connected to said rotary shaft;
   a ratchet pawl engagable with said ratchet teeth for preventing reverse rotation of said rotary shaft;
   a second operating lever mounted on said mounting structure;
   a cam affixed to said second operating lever; and
   a third spring means for holding said cam in said groove of said small diameter portion of said rotary shaft.

2. The motorized fishing reel of claim 1, wherein said third spring is substantially a U-shaped spring pin having a semicircular base and at least two legs parallely extending therefrom and at a distance from each other sufficient to hold said cam; and wherein said mounting structure has a projection for stably holding said semicircular base of said third spring means.

* * * * *